United States Patent [19]
Dooley et al.

[11] Patent Number: 5,220,567
[45] Date of Patent: Jun. 15, 1993

[54] SIGNATURE DETECTING METHOD AND APPARATUS FOR ISOLATING SOURCE OF CORRECTABLE ERRORS

[75] Inventors: Dave Dooley; Chris Satterlee; George Zalewski, all of San Jose, Calif.; Michael R. Crater, Arvada, Colo.

[73] Assignee: Amdahl Corporation, Sunnyvale, Calif.

[21] Appl. No.: 814,275

[22] Filed: Dec. 26, 1991

[51] Int. Cl.⁵ ............................................. G06F 15/74
[52] U.S. Cl. ...................................... 371/5.1; 371/26; 371/29.1
[58] Field of Search ...................... 371/5.1, 16.1, 16.5, 371/19, 23, 25.1, 26, 29.1, 29.5

[56] References Cited

U.S. PATENT DOCUMENTS 5,023,817  6/1991  Au et al. .............................. 371/29.1
5,067,099  11/1991  McCown et al. ..................... 371/161

Primary Examiner—Vincent P. Canney
Attorney, Agent, or Firm—Fliesler, Dubb, Meyer & Lovejoy

[57] ABSTRACT

The invention provides a method and apparatus for generating a signature signal which indicates a probable location for an error-causing mechanism within a digital system, where the digital system has control-signal and data-signal carrying busses and error detection means for detecting error conditions in the signals carried by those busses. The signature generating method comprises the steps of: counting the total number of errors detected by the error detection means during a signature generating run; and counting the number of errors detected by the error detection means during a signature generating run where those errors were accompanied by the presence of accompanying signals on the signal-carrying busses, the accompanying signals being ones which belong to a predefined subset of all signals appearing on the system signal-carrying busses.

2 Claims, 6 Drawing Sheets

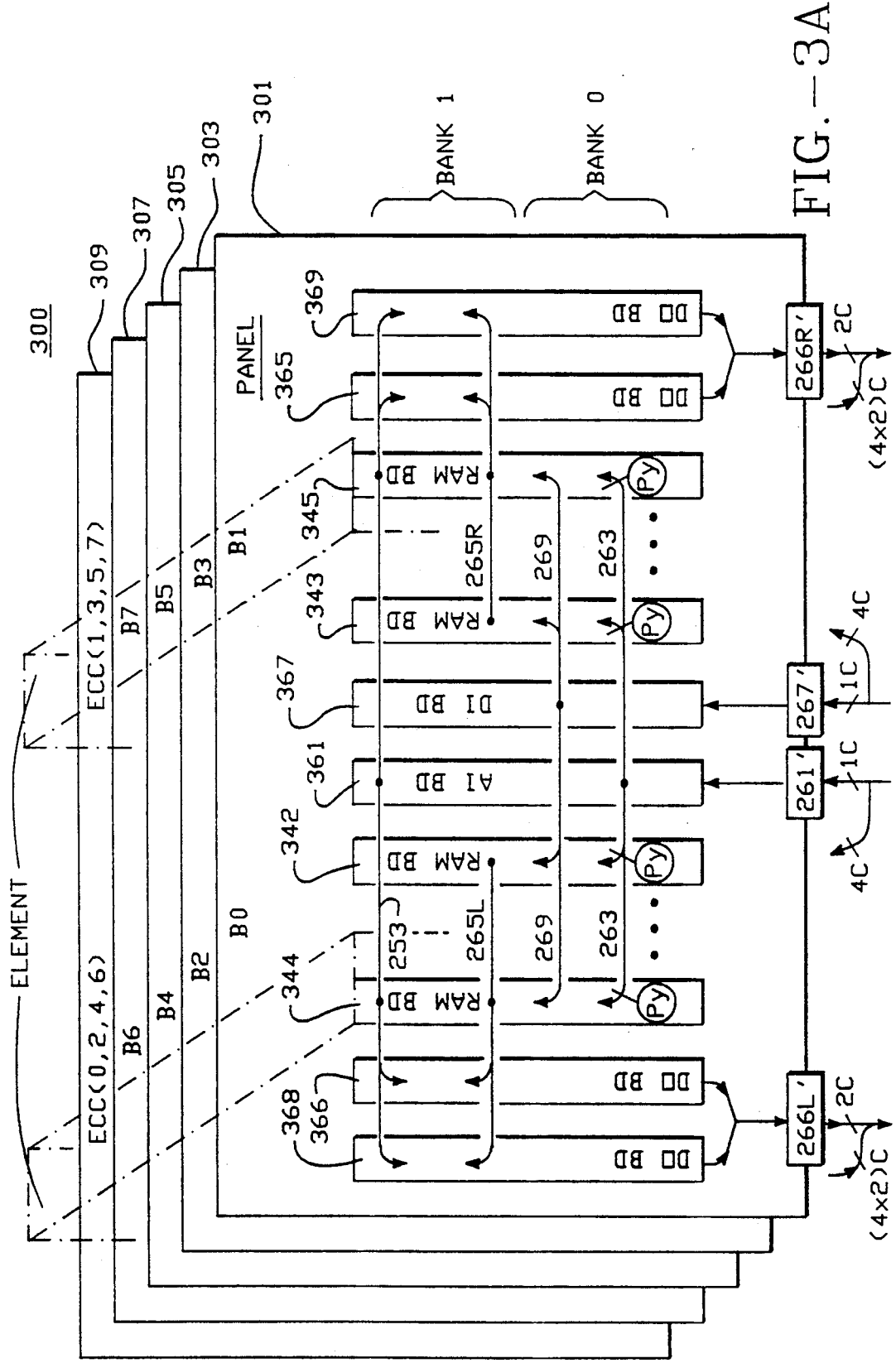
FIG.—3A

SIGNATURE DETECTING METHOD AND APPARATUS FOR ISOLATING SOURCE OF CORRECTABLE ERRORS

BACKGROUND

1. Field of the Invention

The invention relates generally to high-density computer systems. The invention relates more specifically to a signature analysis method which assists in identifying the more probable ones of plural field replaceable units from which correctable errors arise.

1a. Cross Reference to Related Applications

The following copending U.S. patent application(s) is/are assigned to the assignee of the present application, is/are related to the present application and its/their disclosure(s) is/are incorporated herein by reference:

(A) Ser. No. 07/670,289 entitled "SCANNABLE SYSTEM WITH ADDRESSABLE SCAN RESET GROUPS", by Robert Edwards et al, which was filed Mar. 15, 1991 [Attorney Docket No. AMDH7954].

(B) Ser. No. 7/813,891, entitled "IMPROVED METHOD AND APPARATUS FOR LOCATING SOURCE OF ERROR IN HIGH-SPEED SYNCHRONOUS SYSTEMS," by Christopher Y. Satterlee et al., filed Dec. 23, 1991 [Attorney Docket No. AMDH7952].

1b. Cross Reference to Related Patents

The following U.S. Pat. No.(s) is/are assigned to the assignee of the present application, is/are related to the present application and its/their disclosures is/are incorporated herein by reference:

(A) 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981;

(B) 4,661,953, ERROR TRACKING APPARATUS IN A DATA PROCESSING SYSTEM, issued to Venkatesh et al, Apr. 28, 1987;

(C) 4,679,195, ERROR TRACKING APPARATUS IN A DATA PROCESSING SYSTEM, issued to Dewey, Jul. 7, 1987;

(D) 4,791,642, BUFFER ERROR RETRY, issued to Taylor et al, Dec. 13, 1988;

(E) 4,819,166, MULTI-MODE SCAN APPARATUS, issued to Si et al Apr. 4, 1989;

(F) 4,852,100, ERROR DETECTION AND CORRECTION SCHEME FOR MAIN STORAGE UNIT, issued to Christensen et al, Jul. 25, 1989; and (G) 4,855,904, CACHE STORAGE QUEUE, issued to Daberkow et al, Aug. 8, 1989.

2. Description of the Related Art

Modern computer systems are typically constructed of a large number of field replaceable units or FRU's. Examples of FRU's include edge-connected circuit boards, quick-disconnect cables, rack-mounted replacement boxes and other easily-replaceable components. Their use simplifies the repair of in-the-field systems.

When in-the-field system errors occur, and repair by FRU substitution is desired, the main problem is deciding which FRU to replace.

There are two traditional approaches.

Under one approach, the field engineer tries first to pinpoint precisely the circuit from which system errors arise and then the field engineer replaces the associated FRU.

Under the other approach, the field engineer bypasses the task of identifying the errant circuit with any degree of specificity. Instead, the field engineer weeds out the defective FRU through a process of simple trial and error substitution.

Each approach has its share of advantages and disadvantages. The approaches are not mutually exclusive. An engineer can start with one approach and switch to the other in midstream.

For the sake of convenience, the first of the above-mentioned approaches will be referred to as "pinpoint isolation," or "Pin-I" for short. The second of the above-mentioned approaches will be referred to as "Simple Trial and Error FRU Substitution," or "STEFS" for short.

If the Pin-I approach is selected, the step of localizing the source of a problem with pinpoint precision is the main problem. Pinpoint isolation takes time and requires appropriate analysis tools. The upstream costs are relatively high, but successful isolation of faults offsets the downstream costs of not being sure whether the source of each problem has been eliminated.

Trial and error FRU substitution (STEFS), on the other hand, might eliminate a problem in less time and with less up front costs. It does not call for deep analysis. But one can never be sure during, or even after the STEFS process completes, whether a problem has been removed or simply covered up by some mechanism relating to a newly substituted FRU.

STEFS is often selected as the preferred repair method in field environments, particularly where it is believed that isolating the faulty circuit with pinpoint precision will take too long and where the only indication of error is a broad based one (e.g., a checksum error) which is given by an error mechanism that detects but does not localize errors.

Typically, a major part of a computer system or all of the system has to be shut down during the simple trial and error substitution process. System down-time is a function of the total number of FRU's and pure luck.

The field engineer starts going down the line blindly replacing boards and cables (or other FRU's) which are currently installed in the computer with factory pretested boards and cables (or other FRU's). Each unsuccessful swap is immediately undone. The engineer continues to swap boards, cables or other FRU's on an arbitrary basis until the error indication goes away. The board, cable, or other FRU last replaced at the time the error indication disappears is tagged as the probable source of error and taken back to the factory for further analysis and/or repair.

The STEFS method suffers from several drawbacks.

A first problem is that the computer system may have to be shut down for excessively long periods of time as one FRU substitution after another is tried. The likelihood of a long shutdown grows as the number of FRU's increases. It is particularly a problem in large computer systems such as mainframe computers which can have tens or hundreds of FRU's. Each interconnect cable, daughterboard, motherboard, chassis and/or box is considered a FRU.

In the more difficult cases, a system may have hundreds of FRU's and it may be found that the error indication (e.g., checksum error) remains active even after more than 90% of the FRU's have been substituted.

Worse yet, the error indication might disappear after a FRU in the last ten percent has been replaced and then miraculously re-appear as soon as the field engineer leaves the site.

An error indication can temporarily go away simply because a field engineer unknowingly applies stress to a loose wire/contact or otherwise alters conditions in one location while substituting a FRU in a different location. The last replaced board is then incorrectly deemed to be the source of error and returned to the factory for rework. But after the field engineer leaves, the error indication suddenly reappears; primarily because its underlying cause was never corrected in the first place.

A second drawback of the STEFS method is that it is ill adapted for eradicating errors caused by intermittent faults. When the duration between intermittent faults is rather lengthy, and varies randomly, it is not always immediately clear at the time STEFS is being carried out whether the most recently substituted FRU is responsible for the nonoccurrence of error indications in, say the last hour, or whether the intermittent fault indication will reappear if one waits just a little bit longer. It is not clear how long one should wait before concluding that the problem is fixed.

A further drawback of the STEFS method is the inconvenience of requiring field engineers to bring entire repertoires of FRU's to every service job. If there is no indication that makes one FRU more suspect than others, all FRU's have to be considered equally suspect. Substitutes for all in-field FRU's (e.g., cables, daughterboards, motherboards, etc.) have to be brought along to every in-the-field service job.

In many instances, it is desirable to minimize the amount of time spent completing a service job. System down time can be quite expensive.

A prolonged attempt to remove an error condition by way of simple trial and error FRU swapping (STEFS) is most frustrating when the field engineer is not having any luck in quickly eliminating the error indications (perhaps, because their underlying cause is intermittent and somewhat infrequent), and it is realized that the type of errors the engineer is trying to eradicate are self-correctable ones.

Some additional explanation is warranted here.

There are two basic types of system errors: self-correctable ones and system non-correctable ones.

Self-correctable errors are defined as those which the computer can automatically correct on its own, either by retrying a failed operation or by reconfiguring its data paths to circumvent a failed component or by using ECC (Error Correction Code) techniques or through other self-correcting mechanisms. Such self-corrections provide a temporary rather than permanent fix for certain kinds of faults.

One common example of a self-correctable error is a bit flip in memory due to an alpha particle emission. Most computers have parity/retry or ECC mechanisms for detecting and correcting such an error.

Another example of a self-correctable error is one caused by an intermittent open or short circuit which becomes good when a failed operation is retried.

System non-correctable errors are defined here as those arising from faults which the computer cannot correct or circumvent on its own. Human intervention is required.

An example is an error arising from a cable connection which becomes completely undone. If there is no alternate path for signals to travel on, then no amount of operation retries or path reconfigurations will correct the error. The system has to be shut down and the faulty part or parts have to be located and repaired or replaced before users can be safely allowed to come back on line.

Although it is possible, and sometimes preferable, to ignore and repeatedly bypass faults which give rise to self-correctable errors (for example, non-fixable faults such as those which produce a irreducible number of alpha particle emissions), some faults (e.g., intermittent open/short circuits) should be viewed as precursors to, or warnings of, an upcoming non-correctable error.

A more permanent form of correction other than system self-correction becomes advisable when the total number of self-correctable errors in a predefined time period exceeds a predefined threshold. At that point, a judgment is made that it is better to try to find the causes for the self-correctable errors and to permanently fix those that are fixable by, for example, replacing the associated FRU at a conveniently scheduled time (periodic maintenance), rather than waiting and allowing flaws to accumulate or worsen to the point where they produce a system non-correctable, fatal problem at an inconvenient time.

Despite the long-term wisdom of such judgment, when a scheduled repair job is undertaken, and the selected approach is simple trial and error FRU substitution (STEFS); it can become extremely frustrating to have the system shut down for excessively long periods of time. The explanation might be that bad luck was encountered in choosing which FRU to replace fist or that the cause of errors is difficult to eliminate by way of STEFS because the fault is both infrequent and intermittent. But this does not lessen the problem.

The frustration grows yet worse, if the goal of eliminating an excessive number of self-correctable error is not attained after the computer has been shut down for an excessively long time span, and because of other considerations, it is now necessary to turn the system back on. By way of example, the repair attempt may have to be continued at some other time because a scheduled maintenance period is now over.

The frustration is heightened by the awareness that the computer could have been up and running during the entire nonproductive time span but for the decision having been made to use STEFS as the way to eradicate the source of the excess number of self-correctable errors.

The slowness of the STEFS method, particularly in the case where infrequent intermittent errors are involved, is directly attributable to a total lack of knowledge about where the faulty circuit might be located.

A brute force solution to this problem would seek to position error detectors (e.g. parity checkers) at all conceivable points in the computer system where faults may develop. Ideally, every FRU would have its own set of error detectors and these detectors would be coupled to all circuits contained in that FRU. Each source of errors within a faulty FRU would activate the corresponding set error detectors and thereby pinpoint the faulty FRU with specificity.

Such a brute force approach is rarely practical however. Provisions for error detectors have to be judiciously incorporated into computer systems in limited numbers and at points which provide an optimum cost-versus-performance return on investment.

It is not realistic to consider locating error detectors everywhere in very large, high-density computer systems (e.g. IBM or Amdahl mainframes). There are too many circuits and too many potential sources of error. Costs would become prohibitive.

In many instances, functional circuits have to be packed so tightly in a computer (for speed and other practical reasons) that there is no room for including error detecting circuitry in the first place.

Heretofore, in situations where error detecting circuitry could not be included in every conceivable part of every FRU, the field engineer was left to the mercy of blind luck when he/she had to locate an errant FRU on the basis of simple trial and error substitution. A better approach is needed.

SUMMARY OF THE INVENTION

The invention overcomes the above-mentioned problems by providing a signature collection and analysis method which helps field engineers to make more intelligent, less luck-dependent, decisions regarding which FRU or FRU's is most likely to be responsible for causing an unusually high number of self-correctable errors.

The below-disclosed analysis method identifies, in an order of decreasing probabilities, the more probable one or more of plural field replaceable units from which an excessive number of self-correctable errors arise. The analysis method produces a swap-suggestion list that indicates, on the basis of probabilities assigned to each FRU, which field replaceable units should be swapped before others. This helps field engineers to eradicate the cause of self-correctable errors more quickly and efficiently.

The swap-suggestion list is produced by comparing signature patterns associated with simulated errors in a model system against signature patterns obtained from an in-the-field computer system and by determining which model signatures patterns are the closest fits to the in-field observed signatures.

An apparatus which is optimized for extracting and collecting error-source signatures from an in-the-field computer system, while the system operates at full speed, is also disclosed.

In one embodiment of the invention, signature extraction and collection is realized by providing a pattern matching register within an in-the-field computer to capture a full or partial image of an address signal (e.g., an address syndrome) associated with a first detected one of plural correctable errors.

A first counter is provided in the in-field computer to count the total number of correctable errors over a given period of time or until a maximum count is reached.

A second counter is provided to count the number of errors within the total which have associated address signals matching the captured address image of the first detected error in a first part of their respective address fields (e.g., the two most significant bits).

Third and additional counters are further provided to count the number of errors within the total which arise when their associated address signals match the captured address image of the first error in other parts of their respective address fields (e.g., the third most significant bit, or the least significant two bits).

Normalized signature data is obtained by dividing each count of the second, third and additional counters by the total count in the first counter.

The normalized signature data obtained during an in-the-field run is compared against normalized signature data obtained during simulated runs on a model machine.

Different kinds of flaws are simulated in the model machine and signatures are extracted out of he model machine for each kind of flaw. The closest fits between an in-the-field signature and the model generated signatures identify the more probable locations for the in-field flaws.

BRIEF DESCRIPTION OF THE DRAWINGS

The below detailed description makes reference to the accompanying drawings, in which:

FIG. 3A is an exploded perspective view showing the placement of Field-Replaceable Units (FRU's) within a main storage unit (MSU) of the computer system shown in FIG. 2.

DETAILED DESCRIPTION

Figure 1:
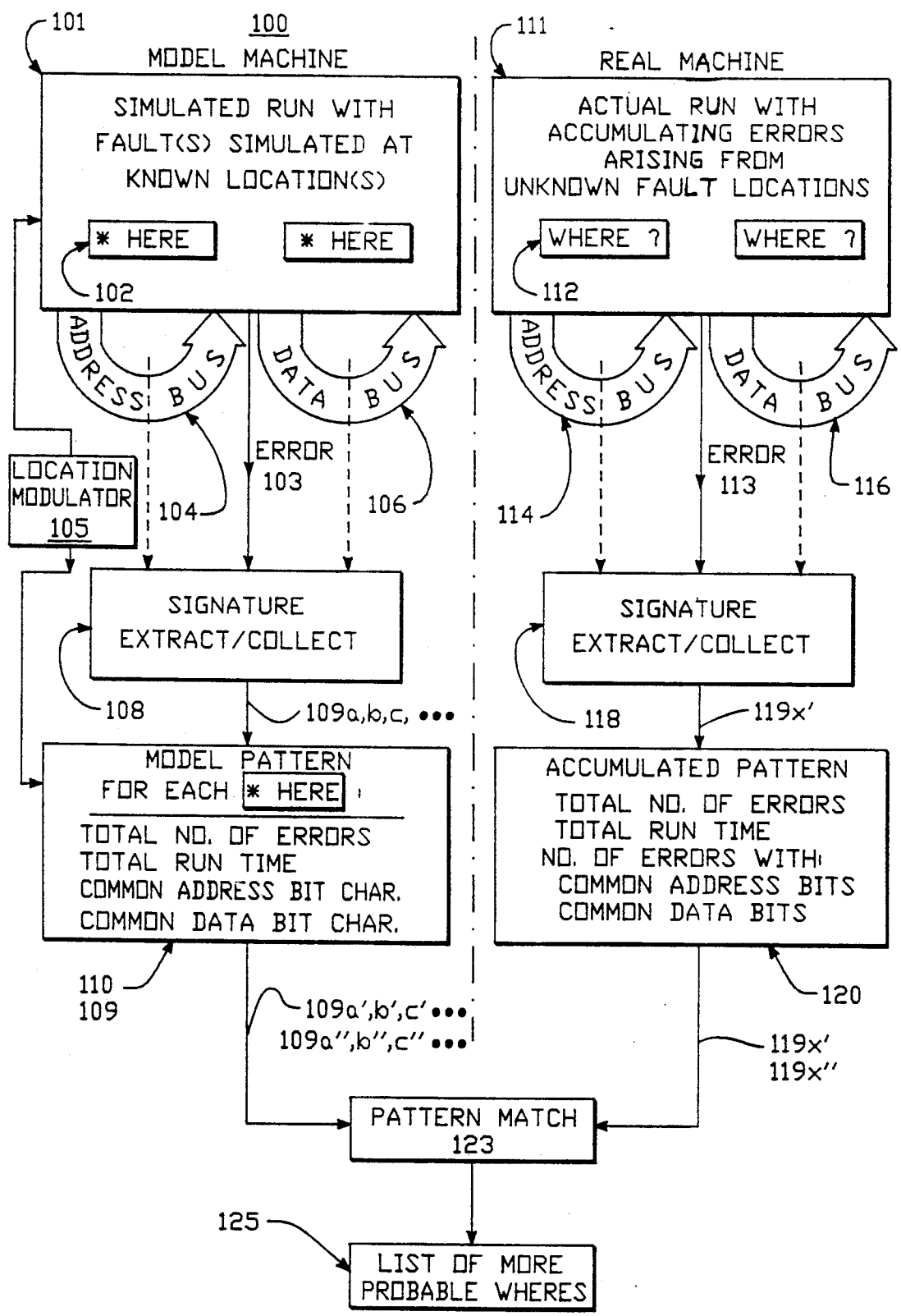
FIG. 1 is a block diagram of a pattern matching scheme in accordance with the invention.

Field observations indicate that certain kinds of self-correctable errors tend to come in the form of bursts. When the bursts of a specific fault are collectively viewed over a long span of time, they appear to have a general rhythm, pattern or theme associated with them. The general rhythm, pattern or theme constitutes a "signature" which can be extracted, even when hidden in the midst of randomly intervening errors. This is done through the use of appropriate statistical correlation tools.

By way of example, consider a cable connector which is located at a position that is subject to periodic mechanical vibrations (e.g., from the motor of a nearby cooling system). Assume the connector has a faulty contact which intermittently disengages from its mate. The contact may make and break many times. This will often occur in synchronism with the periodic mechanical vibrations that are being applied to the connector. Sometimes it may not. Over a long period of time, the fault mechanism will produce intermittent open circuits of a certain average frequency, the frequency being related to the average frequency of the mechanical vibrations.

If the computer tries to transmit a continuous stream of data through the intermittent contact, data errors will occur, on average, at the same average frequency as the intermittent opens.

If the computer tries to periodically transmit short bursts of data through the contact, some will get through while the contact is good, some will coincide with the occurrence of an intermittent open circuit. Error flags will be raised for the latter bursts and their transmission will be retried until successful. Over a long time span, the error rate will be a statistical function of the burst periodicity, the burst duration, and the mechanical vibration frequency.

In general, it should be possible to establish a statistical correlation between the frequency of error occurrences and data burst attributes such as duration, periodicity and other factors.

With regard to the "other factors", assume further, that when the computer tries to periodically transmit bursts of data through its various components (not just through the intermittent contact), each burst of data is accompanied by an address signal whose value fits within a subset of values mapped across the computer's address space, either always or at least a majority of the time. The subset may be visualized as a particular fill pattern which overlays various portions of the computer's address space. Address signals with values fitting into a particular fill pattern are said to belong to a corresponding "class."

Assume however, that when data moves through the particular intermittently-open contact of our example, the majority of address signals (if not all) then generated within the computer are those falling within a particular fill pattern corresponding to that one contact. It may be said that the contact has a peculiar class of address signals statistically associated with it.

Assume alternatively, or additionally, that whenever data moves through the particular contact, it is usually accompanied (statistically speaking) by another data signal which simultaneously moves through a fault-free other part of the computer. The statistically correlated address signals and/or other data signals which usually accompany data signals moving through the subject contact, are referred to here as the "accompanying attributes" of the contact-conducted data signals.

It should be possible to establish a statistical correlation between the accompanying-attributes of each data burst and the identity of each machine part (e.g., each contact) through which the data burst moves.

Given the above two correlations, the first being between fault mechanism and error rate, the second being between error-infected signals and their accompanying attributes; when a specific error occurrence frequency is observed in conjunction with certain accompanying data attributes, it should be possible to point to the more probable locations where faults giving rise to part or a bulk of the errors may exist.

More specifically, consider what happens if the computer sends data through the intermittent contact of our example, and when it does so, most of the time it also issues address signals of a certain class (e.g., address signals which match a certain fill pattern drawn over the address space of the computer). A statistical link will exist between the address signals which are present when errors are detected and the associated fill pattern of the contact. Another statistical link will exist between the rate at which errors are detected and the rate at which the computer tries to send data bursts through the intermittent contact. If the intermittent contact is not self-healing, this statistical link will persist over time.

Errors generated by causes which are not address-related, such as those produced by alpha particle emissions, tend to be evenly distributed across the entire machine. They occur independently of specific address signals and their frequency of occurrence is either small or remains at a steady level. There is no pervasive frequency of occurrence or statistical correlation which links such errors to a specific locality or to specific classes of address signals.

It will be appreciated, of course, that the case of the vibration-sensitive intermittent contact, as used in our example, serves merely as a convenient illustration of certain types of attributes which might accompany each kind of localized fault mechanism. The concept can be generalized to cover other fault mechanisms regardless of whether they are mechanical in nature or not.

The above line of reasoning can be applied to the statistical characteristics of noise-induced faults, thermally-induced faults and so on. Each cause of error may be characterized as having or not having a specific, average frequency of error generation when averaged over a long period of time. Each cause of error may be further characterized as having or not having address signals which on average correspond to a particular fill pattern within the computer's address space and which accompany errors arising from that cause at least a majority of the time. Each cause of error may also be characterized statistically by other personality attributes, as will be discussed in more detail below.

It should be emphasized that the above-mentioned personality attributes are statistical in nature. They are defined by collecting information over long periods of time. If in-field errors are examined individually, each in-the-field error tends to be of a short timed, transitory nature and does not, of its own, reveal any particular pattern of statistical relevance.

Even when a small series of error states (e.g., three to ten) is examined in the field, the underlying cause for each successive error tends to vary randomly and thus, again provides no information of statistical relevance. In one instance, a correctable error might be caused by a spike of external noise. In a next instance an error might be caused by an alpha particle emission. In a later, third instance the error might be caused by an intermittent short or open circuit. The three instances taken alone will not provide sufficient amounts of statistically relevant information for proving the existence of, or locating the position of, what, in hindsight, we know to be an intermittent short/open.

Over long periods of time, the more-persistent sources of error (e.g., the intermittent short or open circuits) reveal themselves by their persistency and their fixed locality. They do not heal on their own and they do not move about. An average error occurrence frequency and a common set of accompanying address or other personality attributes become evident when they are appropriately recorded for each error occurrence and when, after many error occurrences, the information is collectively analyzed for statistical trends.

More specifically, when a fixable, persistent, but at the same time perhaps infrequent and intermittent, flaw develops at a particular location within a computer, a significant number if not a majority of the correctable errors detected by the computer will have a certain probablistic rhythm or pattern to them which is functionally related to: (1) how often they occur; (2) when they occur; (3) what other signals typically accompany them; and (4) where they first arise.

The relation may be expressed more formally by the following Equation(1):

Probability (where)=Function of: (when, how often, commonly-accompanying other signals)

The "where" part of Equation(1) represents the location of the error source and this is the unknown factor which is to be solved for.

The "when", "how often" and "who else" parts of Equation(1) can be measured using signature extraction tools of the type disclosed below.

The "Function of:(. . .)" part of Equation(1) can be derived through simulation and/or modeling.

In accordance with one aspect of the invention, a correlation between the "where" part and one or more of the "when", "how often" and "who-else" factors of Equation(1) is established by simulating fixable flaws in various parts of a model machine and observing the signatures which evolve from such flaws as the model machine runs. This aspect of the invention will become more clear when FIG. 1 is explained below.

The signatures obtained from the model are then tested for pattern matching against signatures extracted from in-the-field runs.

If an in-the-field signature matches or fits closely to one of the signatures generated in the model machine when a particular flaw is simulated in the model machine, it can be deduced that the in-the-field machine probably has one or more fixable flaws located in the same places as did the model machine when simulated flaws of known location were simulated in the model machine.

Errors arising from nonfixable causes (e.g. alpha emissions) are relatively rare and develop with uniform randomness across the physical space and the address space of the in-field machine. So they appear as a kind of background noise which may shift an in-field signature slightly away from a corresponding one of the model signatures. The shift is usually relatively small, and it is therefore often possible to make a good match between an in-the-field signature and one of the model signatures without having to make correction for the contributions of the non-fixable error sources.

Referring now to FIG. 1, a block diagram of a pattern matching scheme 100 in accordance with the invention is shown.

A "model" machine which is known to be initially free of faults is depicted at 101. In practice, the model machine 101 is often implemented as a computer model of an ideal machine. An ideal machine is one that is defined here to be essentially free of faults.

While a computer model of an ideal machine is usually easier to implement, model 101 could alternatively be a physically real machine, which has been tested to prove that it is essentially free of hardware faults.

Model 101 could also be a combination which is partly implemented in hardware and partly in software. Since it is often easier to devise a computer model of a fault-free machine from design specifications rather than to build a fault-free real machine, and since it is easier to simulate faults in such a computer model, the computer modeling approach is preferred.

While not explicitly shown, it is to be understood that model machine 101 is partitioned, at least logically, in accordance with the same partitioning that is to be provided in a corresponding in-field, real machine 111 by the field replaceable subunits (FRU's) of that in-field real machine 111.

It is also to be understood that the model machine 101 includes model means for detecting error conditions and generating error reporting signals 103 which indicate when error conditions occur within the model machine 101, as would the error detecting and reporting mechanisms in an in-the-field real machine (111) of the same basic design.

A set of typical application programs or a statistical simulation of the execution of such programs is executed in the model machine 101 while one or more fault conditions are simultaneously created/simulated at known locations 102 of the model machine 101. (The known fault locations are labelled as [* HERE] in FIG. 1.)

If desired, the simulated fault conditions could include simulated introductions of random noise, to mirror those generated by alpha particles or other random error sources.

A fault-location determining unit 105 (also referred to as a location modulator 105) determines the locations 102 of the one or more faults and generates or models the fault conditions. The locus 102 of the intentionally introduced faults is switched after predetermined lengths of time from a first locus pattern 102a to a second locus pattern 102b and then to a third locus pattern 102c, etc., in order to generate a plurality 109 of corresponding model signature patterns 109a, 109b, 109c, etc., as will be explained in more detail shortly.

A signature extraction/collection unit 108 is provided either in simulated form or as a piece of physical hardware and coupled to receive the error-condition reporting signals 103 from the model machine 101. The extract/collect unit 108 records the occurrence of each error upon receipt of each error-condition reporting signal 103. Unit 108 also records the time when the error report is received.

Unit 108 is further coupled to an address bus 104 of the model machine 101 and to a data bus 106 of the model machine 101. As each error report 103 is received and recorded in unit 108, unit 108 also records a snapshot of an accompanying address word present on address bus 104 when the error occurs and a snapshot of an accompanying data word present on data bus 106 when the error occurs.

A typical first execution run is simulated in the model machine 101 for a predetermined length of time (e.g. 5 minutes, 1 hour, or whatever simulated length is appropriate for statistical purposes) while a fixed locus pattern 102a of one or more faults is maintained in the model machine 101. (The modelled faults can be intermittent over time but their locus remains fixed.) Collecting unit 108 records the resulting error reports, their time of receipt, their associated addresses and data words during this time.

At the end of the run, a signature pattern 119a which identifies attributes common to all the reported errors is developed and stored in a storage unit 110. The stored signature pattern 109a is identified as belonging to the current locus of faults 102a.

The model signature pattern 109a that is developed for the first locus of faults 102a includes, but is not limited to, information indicating: (a) the total number of received error reports, (b) the total run time (in terms of clock cycles or real time or other relevant events), (c) the common statistical characteristics of each address bit on bus 104 as viewed over time (e.g., whether a particular address bus bit remains stuck at logic "0", whether the bit remains stuck at logic "1", whether the bit spends 50% of the time in each of the "0" and "1" states, whether the bit spends some other percentage of the time in each of the "0" and "1" states, etc.), and/or (d) the common statistical characteristics of each data bit on bus 106 as viewed over time (e.g., what measured percentage of the total run time the bit spends in the "0" or "1" state).

At the end of the first or each subsequent run, the fault-location determining unit 105 is switched to produce a new set of fault conditions, 102b, 102c, etc. and a corresponding set of model signature patterns 109b, 109c, etc. This process continues until a plurality of model patterns 109 are collected for faults located in all typical positions of each FRU portion (logical partition portion) of the model machine 101.

After all runs are completed in the model machine 101, the model patterns 109a, 109b, 109c, etc. which are stored in unit 110 are examined to identify their distinguishing characteristics. These are attributes which distinguish at least one model pattern 109x from a second pattern 109y. It may be found that some attributes do not help in distinguishing one signature from the next. For example, if address bit number five spends 50% of its time in the zero state for all simulated flaws, there is no point to keeping a record of that bit. The distinguishing characteristics of the collected signatures are defined as the individual signatures 109a', 109b', 109c', etc., of each of the simulated fault patterns 102a, 102b, 102c, etc.

A counterpart "real" machine 111 is illustrated in FIG. 1 next to the model machine 101. This does not imply that real machine 111 is physically positioned next to model machine 101. Rather, it is so illustrated to show the correlation between the signature extraction process carried out in the model environment (101) and a counterpart process carried out in the real machine (111).

While the model machine 101 typically resides in a development laboratory, the real machine 111, typically resides in a less controlled field environment. Machine 111 is a physically implemented machine which executes actual application programs (not simulated ones) and occasionally, because it is not perfect, it detects and reports and self-corrects correctable errors which arise from unknown fault locations 112 within it (within the real machine 111).

The unknown fault locations 112 of real machine 111 are labelled [WHERE ?] to distinguish them from the known [* HERE] fault locations 102 of the model machine 101.

A signature extraction/collection unit 118 is provided, preferably in the form of physical hardware such as described below, to receive error-condition reporting signals 113 from the real machine 111. Unit 118 operates in counterpart to the signature extraction/collection unit 108 of the model environment.

Unlike the extract/collect; unit 108 of the model environment, the signature extraction/collection unit 118 of the real environment has its circuitry and execution time minimized to extract, collect and otherwise focus on the associated address or data bits which distinguish the "individual" signature portions 109a', b', c', . . . of each of the plural fault patterns 109 stored in memory unit 110 of the model environment. Address or data bits of respective real buses 114 and 116 which do not in some way help to distinguish one signature from the next are preferably not recorded or analyzed.

Like its model counterpart, the real extract/collect unit 118 records the occurrence of each error upon receipt from the real machine 111 of each error-condition reporting signal 113. It also records a snapshot of relevant (signature-distinguishing) bits in the associated address word on address bus 114 of the real machine 111 and a snapshot of relevant (signature-distinguishing) bits in the associated data word on a data bus 116 of the real machine 111.

After a predetermined length of time has expired in the real machine environment, usually when real machine 111 is scheduled for a next maintenance shut-down (e.g. once every 24 hours or whatever length of time is found appropriate for practical and statistical purposes), an accumulated signature pattern 119x' will have been recorded into storage unit 120 by the field extract/collect unit 118.

The accumulated signature pattern 119x' may include but is not limited to, information indicating: (a) the total number of recorded errors; (b) the total run time for which errors were recorded; (c) the number of recorded error conditions which share a particular common statistical characteristic for each one or more relevant address bits on bus 114 as viewed over time (e.g., whether address bits $A_i$-$A_j$ remain stuck at logic "0", whether bits $A_k$-$A_m$ remain stuck at logic "1", whether bits $A_n$-$A_p$ spend 50% of the time in each of the "0" and "1" states, bits $A_q$-$A_r$ spend between 10% to 30% of their time in one of the "0" and "1" states, etc.); and/or (d) the number of recorded error conditions which share a particular common statistical characteristic for each one or more relevant data bits on bus 116 as viewed over time (e.g., whether data bits $D_i$-$D_j$ spend x to y percent of their time in the z state, where i, j, x, y and z are predefined identifiers).

At the beginning of a maintenance shut-down for the real machine 111, a pattern matching unit 123 fetches the accumulated signature pattern 119x' from memory unit 120, converts that pattern 119x' into a normalized form 119x" (by, for example, dividing its above parameters (a) through (d) either by the total run time (parameter a) or by the total number of errors (parameter b) or by some other normalizing parameter.

Normalized pattern 119x" is then compared within pattern matching unit 123 against normalized versions 119a", 119b", 119c", etc., of model patterns 109a', 109b', 109c', etc., looking for the best fits.

The best, next-to-best, and subsequent fits are then displayed (listed) at 125 in descending order from best to least-matching order. Listing 125 is then supplied to a field engineer and the field engineer uses listing 125 to determine which FRU to swap first, and if that swap does not successfully eliminate an error indication, what other FRU's should be next swapped.

Given the above, broad-based description; a more specific example will now be considered.

Figure 2:
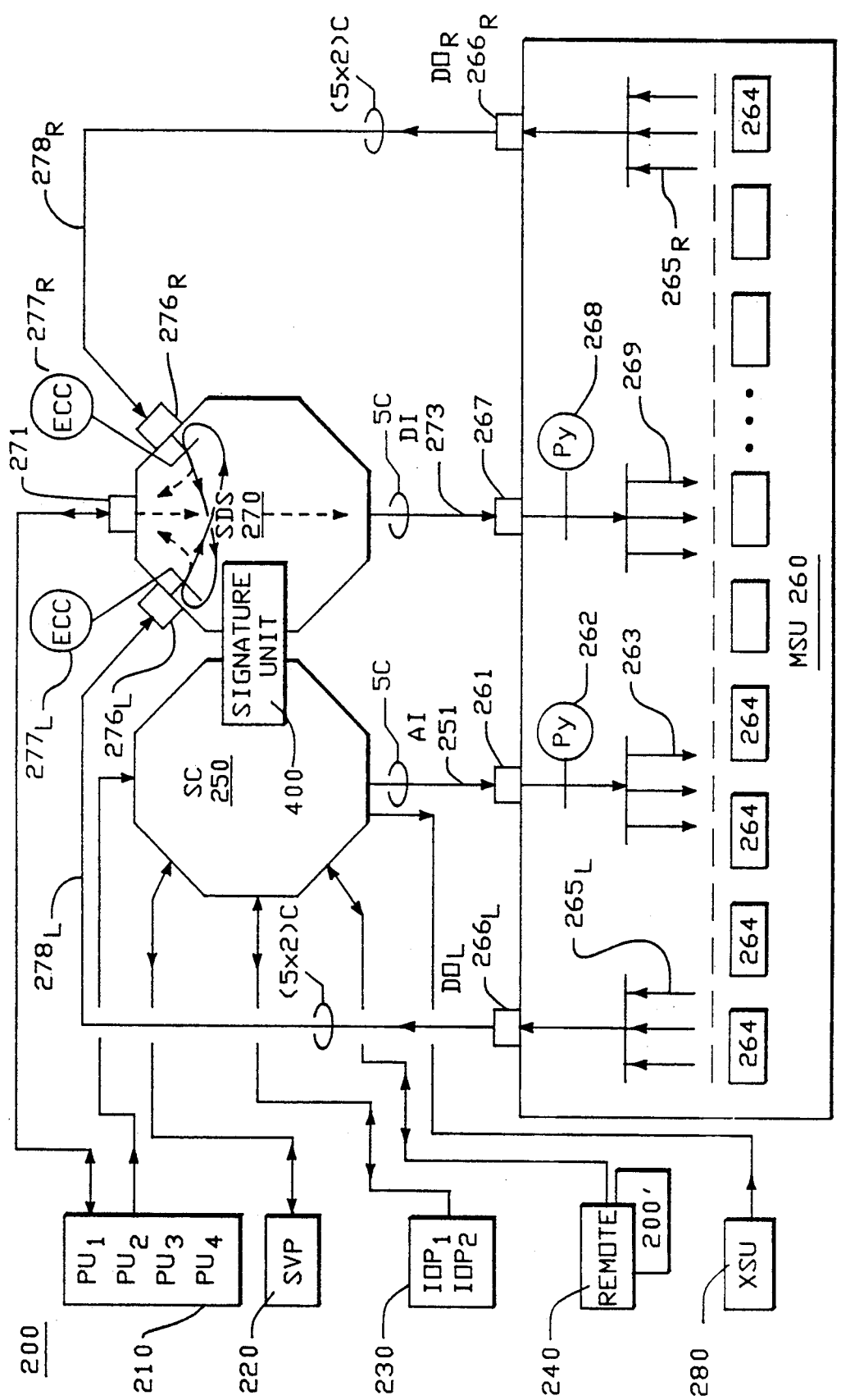
FIG. 2 is a block diagram of a computer system in accordance with the invention.

FIG. 2 is a block diagram of a computer system (real machine) 200 which is structured in accordance with the invention. A signature unit 400 corresponding to the earlier described signature extract/collect unit 118 is shown extending from a system controller (SC) 250 to a system data switch (SDS) 270 of computer system 200. The structure and operation of this signature unit 400 will be described below in due course.

Computer system 200 comprises a group 210 of processor units ($PU_1$, $PU_2$, $PU_3$, $PU_4$), a service processor (SVP) 220, a group 230 of Input/Output Processors ($IOP_1$, $IOP_2$), a main storage unit (MSU) 260, an expansion storage unit (XSU) 280 and a remote coupling unit 240, intercoupled as shown. Remote coupling unit 240 optionally couples the illustrated computer system 200 to a like-structured, twin system 200' (not shown in detail). When computer system 200 is coupled to its twin 200', the combination is referred to as a two-sided system. If system 200 is not so coupled, then it is referred to as a one-side system.

The main focus here will be on the problem of isolating faults to the replaceable board and cable level within the main storage unit (MSU) 260. The internal structure of MSU 260 is accordingly shown in greater detail than that of other units of FIG. 2. It is to be understood, however, that the invention is not limited to isolating faults to the FRU level only in MSU 260. The disclosed concepts, structures and methods may be similarly applied to the problem of identifying which of plural FRU's found within other units of system 200 is/are the more likely to contain a fault mechanism which gives rise to an excessive number of correctable error conditions.

MSU 260 comprises banks of densely packed static random access memory (SRAM) devices (not shown). It also contains address-signal forwarding circuits (261,263) and data read/write circuits (265,269) which couple to the SRAM devices. These memory devices and signal-carrying circuits are distributed over a large number of integrated circuit chips and printed circuit boards. They are so tightly packed within the MSU 260 that there is barely enough room left for the inclusion of a minimal amount of error detection circuitry inside the MSU 260. Elements 262 and 268 are the only error detectors included within MSU 260. Their operations and limitations will be discussed in due course.

Before the internal architecture of MSU 260 is examined in more detail, it is beneficial to first have an overview of system 200. The system control unit (SC) 250 coordinates the exchange of control signals between the MSU 260 and other parts of the computer system 200. The SDS 270 serves as a common data path for exchanging data between units. SDS 270 is in essence a crossbar router whose resources are under the control of the system control unit (SC) 250.

Control signals move through the SC 250 while corresponding data signals move through the SDS 270.

By way of example, when one of the processor units 210 (e.g. PU$_1$) wants to fetch data from the MSU 260, the processor unit (PU$_1$) sends a request to the SC 250 indicating the address of a data block within the address space of MSU 260 where the desired data resides and asking the SC 250 to transfer that block, through the SDS 270, as soon as transfer resources (crossbar routing paths) within the SDS 270 become available.

Multiple ones of the processor units 210 can request data from the MSU 260 at one time. The SVP 220, IOP's 230 or remote system 200' can also send requests for access to MSU data at the same time. The SC 250 is responsible for prioritizing all received requests and servicing them in turn.

In servicing a main storage access request, the SC 250 supplies an address input signal (AI) over cable path 251 to an address-receiving port 261 of the MSU 260. (Cable path 251 comprises five logical cables going to 5 corresponding panels. The symbol "5C" is used to identify cable path 251 as a path which has 5 logically-separate cable sets. This will be further explained when FIG. 3A is discussed.) A parity checker 262 is positioned within MSU 260, just after port 261, to verify that the AI signal received over cable 251 has proper parity as it enters through port 261. If a parity error is detected at the point checked by detector 262, an error report is sent back to SC 250 (by way of an error history tree, not shown) and the SC 250 sends an "unable-to-complete" message to the device (e.g. processor unit) which requested the data transfer. The requestor then decides whether to ask for a retry of the transfer operation.

Because of space constraints, there is a limited number of error detectors provided within MSU 260 for confirming the integrity of the AI signal as it moves deeper into the MSU 260 through subsequent address-signal propagating circuits 263. (There is one more level of error checking provided where address signal enter individual RAM boards. See FIG. 3A.)

The AI signal which enters port 261 fans from circuits 263 out to a plurality of memory modules 264 within MSU 260. Each memory module 264 and its corresponding address-delivering circuits 263 are constructed as part of one or more field replaceable units (FRU's). The FRU's (e.g., circuit boards and interconnect cables) are arranged so that defective portions of the MSU 260 may be quickly replaced in a field environment.

MSU 260 is physically and logically divided into left and right storage portions. Its memory modules, 264, are distributed across the left and right portions of MSU 260. Even-numbered bytes are stored in the left-side modules while odd-numbered bytes are stored in the right-side modules. Data cable 278L can be logically divided into a set of five-by-two subcables. Each pair of subcable comes from one of five panels (FIG. 3A) in MSU 260. Similarly cable 278R can be logically divided into a set of five-by-two subcables. A corresponding pair of left and right data-outputting circuits, 265L and 265R, and left and right data-output ports, 266L and 266R, are provided on MSU 260 for carrying output data from memory modules 264 to a corresponding set of left and right service ports, 276L and 276R, on the SDS 270. The data signals are carried by way of left and right data cables, 278L and 278R.

Upon entering SDS 270, odd and even numbered bytes are recombined as indicated by the bow-tie like data path drawn within 270, and then data signals are redistributed to left and right sides of SDS 270 in the form of odd-numbered and even-numbered doublewords. Left and right error correction code (ECC) circuits, 277L and 277R, are provided within SDS 270, and positioned respectively after service ports, 276L and 276R, for checking and correcting each doubleword received from MSU 260 over cables 278L and 278R. (Bubbles 277L and 277R represent the ECC circuits inside SDS 270. They are shown outside of the octagon that represents SDS 270 only for the purpose of illustrative clarity.)

If an error (a correctable error) is found to be included in data received at SDS service ports 276L and 276R, the ECC circuits 277L and 277R automatically detect and correct such errors. Error-free data subsequently flows from the ECC circuits 277, through port 271 of the SDS to the requesting processor unit 210 (e.g., PU$_1$). While not shown in FIG. 2, it is to be understood that each of the ECC circuits 277L and 277R generates an error-condition reporting signal when an error is detected. The error-condition reporting signal is directed to a number of receivers including the signature unit 400, as will be seen later below.

When a processor unit (e.g., PU$_1$) wants to store data in the MSU 260, address signals (AI) flow from the SC 250 to the MSU 260 over cable 251, as explained before. Additionally, data from the requesting processor unit 210 flows into SDS service port 271 and from there into a transfer buffer (not shown) within SDS 270 for temporary storage therein. When the SC 250 decides that the MSU 260 is ready to accept the buffered data, it instructs the SDS 250 to output the buffered data over cable 273 to a central data input port 267 of MSU 260. The data signals moving across cable 273 are referred to here as data input (DI) signals.

A parity checker (Py) 268 is provided within MSU 260, just after data input port 267 for verifying the parity of the received data input (DI) signals. Thereafter, the input data (DI) fans out through a plurality of input data distributing circuits 269 to the memory modules 264 in the left and/or right sides of MSU 260 for storage in selected ones and/or selected regions of memory modules 264.

Data words stored within MSU 260 include error correction code (ECC) fields. More specifically, a four adjacent-bits detect and correct code is utilized. Any erroneous flip of as many as four adjacent bits in a particular nibble of a stored data word can be automatically corrected. Errors which spread across two or more nibbles of a same data word can be detected, but not automatically corrected.

Errors can infect the signals passing through MSU 260 in a variety of ways. A noise spike can flip some bits as they pass over DI cable 273 on their way to central data input port 267. Parity detector (Py) 268 is positioned to detect such errors and to isolate the cause of error as something relating to cable 273. For performance reasons, the error-infected data is initially stored as-is in MSU 260. This is done because there is an inherent latency in the error reporting and recovery mechanisms of the system. By the time the recovery mechanisms detect the error condition and stop clocks, the error-infected data has already been stored. After clocks stop, the recovery mechanism accesses error-infected portions of the computer, using a scan system, and cleans up the error-infected data.

Parity detector 268 is positioned, however, such that it cannot detect errors which infect data words as they subsequently fan out through data-carrying circuits 269 into modules 264, or as they travel back over data return circuits 265 and cables 278 to the SDS 270. For example, there may be an intermittent contact between an IC chip and its supporting board somewhere among modules 264. Detector 268 can neither detect nor localize the problem. The ECC circuits 277 can detect, and sometimes correct, errors injected into the data words anywhere along the path from parity detector 268 through SDS service ports 276, but the ECC circuits 277 cannot pinpoint the location where the errors were first introduced into the data flow. The path from detector 268 to detectors 277 can contain a large number of FRU's, any of which could be responsible for infecting data with correctable errors.

Aside from the data-carrying paths, errors may also be introduced in the address-specifying paths between parity detector 262 and modules 264. If an input address signal (AI) contains an erroneously-flipped bit, nibbles of data might be retrieved from or stored into the wrong locations within memory modules 264. ECC circuits 277 may be able to detect the presence of a nibble that has been improperly inserted into a word fetched from the MSU 260, but they are not able to determine whether the error is due to a stuck address line somewhere within MSU 260 or due to a fault in one of the data carrying paths.

It should be noted at this juncture, that every data input word (DI) which enters MSU port 267 and every data output word (DO) which leaves one of MSU ports $266_R$ and $266_L$ is accompanied by a referencing address (AI) signal that is applied to port 261. This operational feature of MSU 260 corresponds to the "who else" part in the earlier discussed Equation(1). If there is an error in output data (DO) leaving MSU 260, that data is always accompanied by a referencing address signal (AI).

It should also be noted at this juncture that, as data is being fetched out of MSU 260, there will be a finite delay between the time when an input address (AI) signal is applied at port 261 and an output data word (DO) moves from MSU port 266 over cable 278 to SDS port 276 and through ECC circuits 277. If an error-condition reporting signal issues from the ECC circuits 277, the error reporting signal is shifted in time relative to the address input signal (AI) which gave rise to the error-infected data (DO) signal. The significance of this will become clear in due course.

Referring now to FIG. 3A, the physical structure of a relevant portion 300 within MSU 260 will be described. MSU 260 is contained within an enclosure that supports five main panels. The structure of portion 300 is illustrated in perspective as comprising five such main panels respectively referenced as 301, 303, 305, 307, and 309. The first four panels, 301-307, store data bits while the fifth panel, 309, stores error correction code bits (ECC).

Each of the five panels, 301-309, is identical in structure and each has a plurality of 10 minimum and as many as 22 printed circuit daughterboards removably plugged into it. Each daughterboard is considered a field-replaceable unit (FRU). Not counting interconnect cables or other items which might be considered FRU's, the five panels 301-309 of MSU portion 300 accordingly can support at least 110 FRU's.

The storage capacity of MSU 260 is incremented by adding quantum blocks of four-by-five (or put more simply, 20) so-called "RAM boards". Four RAM boards are added to each of the five panels. A first pair of the four RAM boards added to each panel store even-numbered bytes while the other pair stores odd-numbered bytes. Panel 301 stores only bytes B0 and B1. Panel 303 stores only bytes B2 and B3. Panel 305 stores only bytes B4 and B5. Panel 307 stores only bytes B6 and B7. Panel 309 stores error correction code for the data stored in the preceding four panels 301-307. The error correction scheme uses a four-to-one compression factor. There is one bit of correction code for every four bits of stored data.

Each incremental quantum of added storage is referred to as an "element". Sectional slabs representing one such element are drawn in FIG. 3A. The element cuts through the storage array in the Z direction to take in all even and odd-numbered bytes as well as the corresponding correction code.

The structure of main panel 301 will be described now in more detail as exemplary of the structure of the other panels 303-309. As shown within the boundaries of panel 301, each panel comprises a pair of left-side data-out (DO) driver boards, 368 and 366, coupled to drive the left-side DO output port $266'_L$. (The two logical cables, 2C, emerging from output port $266'_L$ dove tail with four other pair of logical cables to define the overall left-side data-out cable $278_L$.) Each panel further includes a pair of right-side data-out (DO) driver boards, 365 and 369, coupled to drive the right-side DO output port $266'_R$. (The 2C subcables emerging from port $266'_R$ dove tail with four other pairs of subcables to define right-side cable $278_R$.)

An input-address (AI) receiving board 361 is provided centrally on each panel (e.g., 301) for receiving address input (AI) signals from MSU port 261. An input-data receiving board 367 is further provided centrally on each panel for receiving input data (DI) signals from MSU port 267.

A first byte-storing group (B0) of RAM boards 342-344 is interposed between AI board 361 and DO board 366 at the left side of panel 301. A second byte-storing group (B1) of RAM boards 343-345 is interposed between DI board 367 and DO board 365, as shown, at the right side of panel 301. There can be as many as eight RAM boards in each of the first and second byte-storing groups (B0, B1), thus providing a maximum of sixteen RAM boards on each panel (e.g., 301). The minimum number of RAM boards on each panel is four, where the four RAM boards belong to a single element.

Each RAM board (e.g., 344) supports as many as 128 SRAM (static random access memory) integrated circuit chips plus a host of other chips for delivering address and data-in signals to the SRAM chips and carrying away data-out signals from the SRAM chips. Each RAM board further includes connectors for coupling these signals to a board-to-board interconnect network. The SRAM chips of each RAM board are physically segregated into upper and lower banks; These are referenced as BANK0 and BANK1 in FIG. 3A.

Address fan-out circuits 263 distribute address signals from AI board 361 to the plural RAM boards, 342-344, 343-345. (A dot is drawn on AI board 361 to indicate that this is the source of signals traveling through circuits 269 to the arrowhead positions where they move to the SRAM devices of the RAM boards.)

Control fan-out circuits 253 distribute control signals from AI board 361 to the plural data-out boards, 365, 366, 368, 369. (A dot is drawn on AI board 361 to indicate that this is the source of control signals traveling through circuits 253 to the arrowhead positions where they move to the DO boards.)

Data fan-out circuits 269 similarly distribute signals from the DI board 367 to the same RAM boards. (A dot is similarly drawn on DI board 367 to indicate this as being the source of signals carried by circuits 269.)

Data collecting circuits $265_L$ collect data output signals from the even-byte (B0) storing RAM boards 366-344 and fan them into the left-side DO boards, 366 and 368. Right-side data collecting circuits $265_R$ similarly collect data output signals from the odd-byte (B1) storing RAM boards 343-345 and fan these into the right-side DO boards, 365 and 369. (Dots are drawn on the RAM boards to identify them as the sources of signals carried by circuits 265.)

While the respective left and right, even-byte and odd-byte storing halves of first panel 301 are referenced as (B0) and (B1), the corresponding halves of second panel 303 are referenced as (B2) and (B3), the corresponding halves of third panel 305 are referenced as (B4) and (B5), and the corresponding halves of fourth panel 307 are referenced as (B6) and (B7).

The RAM boards of fifth panel 309 store ECC data for detecting/correcting error conditions in the data banks of the first through fourth panels (301-307). The left set of RAM boards in fifth panel 309 are referenced as ECC (0,2,4,6) because they store the ECC data for respective bytes B0, B2, B4, and B6. The RAM boards in the right side of fifth panel 309 are similarly referenced as ECC (1,3,5,7) because they store ECC data for respective bytes B1, B3, B5 and B7.

MSU 260 is potentially subject to at least the following fault conditions: (1) An intermittent or permanent failure may occur within any one of the SRAM chips within the data or ECC banks of MSU portion 300. One possible failure at the SRAM chip level, is an intermittently open solder connection between a chip terminal and its supporting RAM board. Another possible failure is an intermittent short circuit due to a solder splash between terminals of an SRAM chip.

Additionally, MSU 260 is potentially subject to the following fault conditions: (2) an address bus driver within AI board 361 or within address signal distributing circuits 269 may fail and leave an address line in a stuck-at state; (3) a data-bus driver within DI board 367 or within data distributing circuits 269 may fail and leave a data line in a stuck-at state; (4) a data collecting circuit within fan-in circuits 265 or one of the DO boards 365-369, may fail and produce erroneous data outputs for all address signals referencing the respective back; (5) a card connecter coupling one of the RAM boards 344-342, 343-345 to its supporting panel (301) may suffer from an intermittent contact which introduces errors into data accompanied by address signals referencing that RAM board; and (6) cables (not shown) which couple MSU ports 261, 266, 267 to each of panels 301-309 and/or which couple the ports to one of the SC unit 250 and SDS unit 270 may suffer from a short or open circuit.

The latter-mentioned interconnect cables are considered to be field-replaceable units (FRU's) as are all boards supported on main panels 301-309. The above list of possible failure modes is not intended to be exhaustive.

When FIG. 3A is taken in whole, the field engineer's dilemma can be better appreciated. If one or both of ECC units $277_L$ and/or $277_R$ (FIG. 2) begin to report an excessive number of correctable errors, how is source of such errors to be eliminated? If repair is to be undertaken by way of simple trial and error FRU substitution (STEFS), the field engineer has to decide where to begin among the more than 100 FRU's within MSU portion 300.

One way to overcome this dilemma is to record data which allows one to make a statistical correlation between the address signals usually accompanying error-infected data and the components of MSU 260 which are most likely to carry data that is accompanied by these address signals.

Figure 3B:
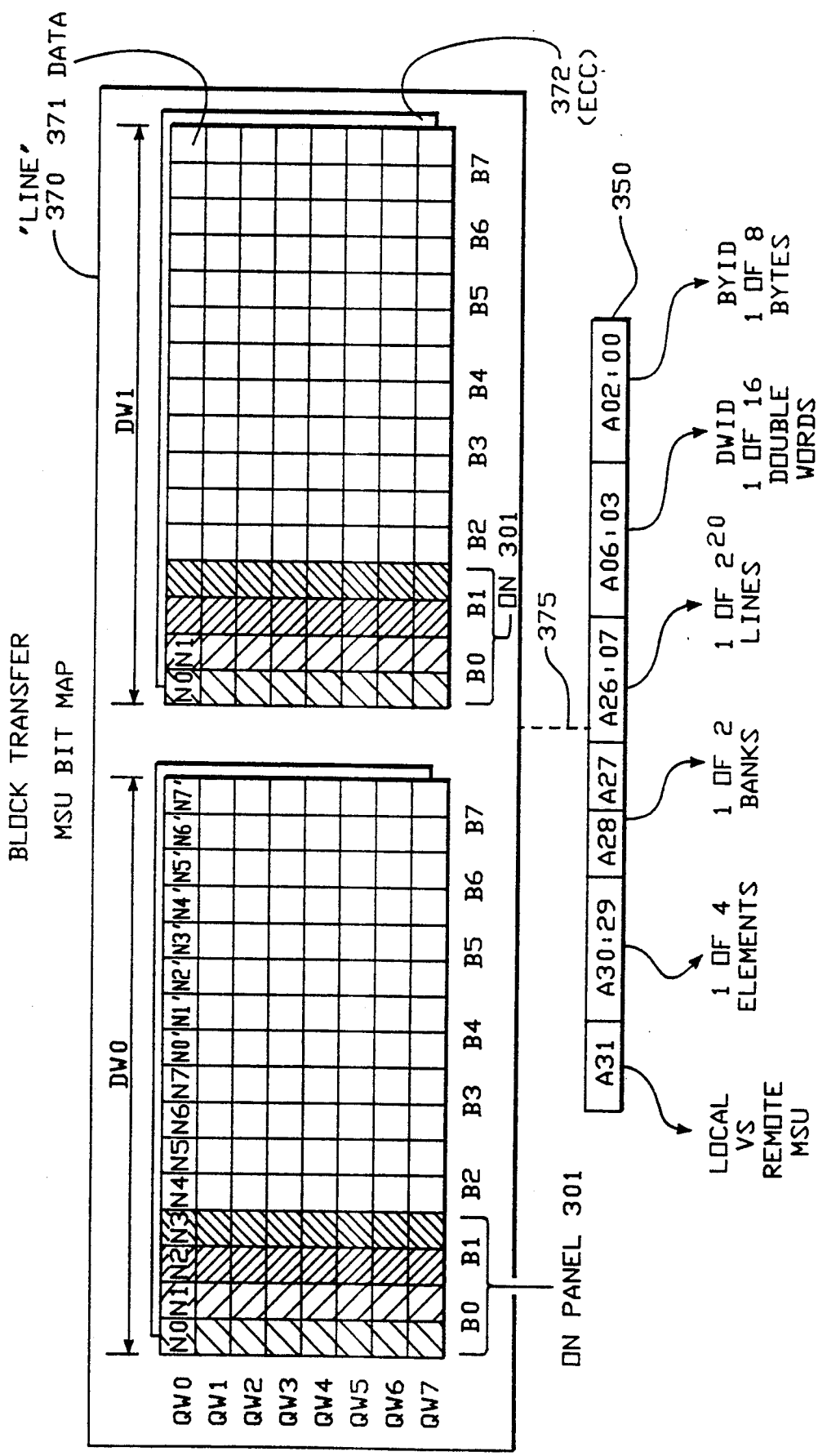
FIG. 3B shows the mapping of nibbles into the MSU of FIG. 3B according to supplied address bits.

Referring to FIG. 3B, the mapping of data bits into the memory banks of MSU portion 300 is shown.

There is a minimum of one and as many as four data storing elements in MSU portion 300, as already mentioned. Each element is divided into upper and lower banks. Each bank can store as many as $2^{20}$ "lines" of data. The RAM boards within an element can have one or both of their bank-supporting sides populated with SRAM chips. A bank-select signal is provided to each RAM board for selecting either the upper or lower bank (BANK1 or BANK0). Whenever data is transferred to or from MSU portion 300, a minimum quantum of data 370 moves into DI port 267 or out of DO ports 266. This minimum quantum of data is referred to as a "line" or as a "block."

A single block (line) of data is represented in FIG. 3B as that contained within the boundaries of rectangle 370. Such a block 370 comprises a total of eight "quadwords" (QW0-QW7). Each quadword (QW) comprises two "doublewords" (DW0 and DW1). Each doubleword (DW) contains two datawords. And each dataword is composed of eight "nibbles." A nibble is defined as four adjacent bits of data. Two nibbles make a byte.

The eight nibbles of the first data word in each doubleword (DW) are referenced as N0-N7 while the eight nibbles of the second data word in the same DW are referenced by the primed symbols, N0'-N7'.

As already mentioned, each of panels 301-307 in MSU structure 300 stores the bits of only two adjacent bytes out of each doubleword (DW). Panel 301, for example, stores only bytes B0 and B1 of each of the doublewords (DW0 and DW1) in each of the eight quadwords (QW0-QW7). Panel 303 similarly stores only the bits of only bytes B2 and B3. And when the sequence is continued to logical its end, it is seen that the last data panel 307 stores only the bits of bytes B6 and B7.

The above-described data bits can be visualized as residing in a data plane 371. Each plane's worth 371 of data bits that is transferred into/out of MSU 260, is accompanied by a corresponding block's-worth of ECC bits 372 that is also transferred. The ECC plane 372 is shown underlying the data plane 371 within quantum block 370. For every eight bytes (one doubleword) of data, there are two corresponding bytes of ECC information (1:4 ratio). It is to be understood that the same address signals which accompany the bits of data plane 371 also accompany the bits of ECC plane 372.

The linkage between a block (line) of data 370 and its accompanying address signal 350 is indicated by dashed line 375.

Address signal 350 comprises 32 bits, respectively labelled A31-A00. Bit A31 designates either the local MSU 260 or a twin MSU within the twin system 200' (FIG. 2) as the addressed MSU. Address bits A30 and A29 select one of the four elements within the selected MSU. Address bit A28 selects either the upper or the lower bank of the selected element. Address bit A27 is reserved for future expansion. Address bits A26 through A07 select one of two-to-the twentieth power ($2^{20}$) lines within the selected bank. Address bits A06 through A03 select one of sixteen doublewords in a chosen line. Address bits A6-A3 are referred to as the doubleword identifiers, or DWID for short. Overlapping with this function, address bits A6 through A4 identify one of eight quadwords in the chosen line. Address bits A6-A4 are therefore referred to as the quadword identification, or QWID for short.

Address bits A02 through A00 identify one of eight bytes in the chosen doubleword. Accordingly, A02-A00 is referred to as the byte identification or BYID for short. In some machines an additional bit is presented for identifying a desired one of the two nibbles (N0, N1) in a selected byte.

When the ECC circuitry 277 within the system data switch (SDS) 270 is found to be correcting more than a predetermined threshold of correctable errors, a warning indicator is activated. The warning indicator (not shown) tells the system operators that there is probably a fixable flaw rather than a set of random causes (e.g., alpha particles) which is responsible for generating the excess number of correctable errors. Since there are many components within MSU 260, and there are just a few error detectors (e.g. 262 and 268) positioned between the address/data entry ports, 261 and 267, until the point where data is next checked by ECC circuitry 277, the system operators are left with the problem of how to localize the source of excess errors.

The signature extraction unit 400 of FIG. 2 assists in solving this problem.

Figure 4:
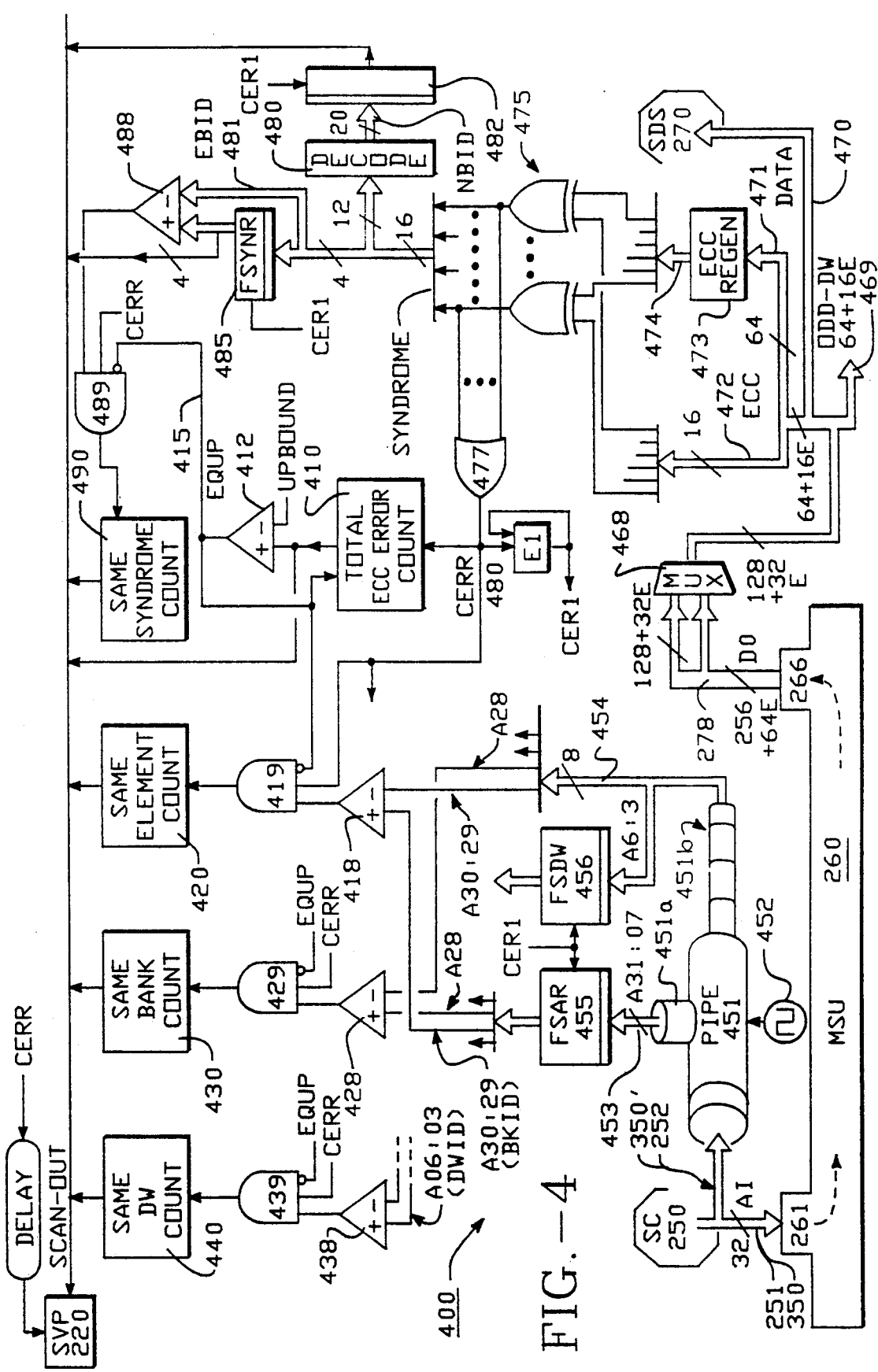
FIG. 4 is a schematic diagram showing how a signature is extracted from signals flowing through the computer of FIG. 2 while the computer executes normal application programs at full speed.

FIG. 4 illustrates the structure of one such signature extraction unit 400 in more detail.

As already mentioned, signature unit 400 extends between the system controller (SC) 250 and the system data switch (SDS) 270. The 32-bit wide address-input (AI) bus which carries address signals from SC 250 to port 261 of MSU 260 is shown at the bottom left corner of FIG. 4 and designated as 251. The data-output port 266 of the MSU is shown at the bottom center of FIG. 4. It supplies 256-bit wide data words plus an additional 64-bits of error correction code (ECC) through cable 278 to SDS unit 270. In the SDS 270 a multiplexer 468 serializes each parallel-received block of 256 bits of data plus 64 bits of ECC (symbolized as 256+64E) into sequential blocks of 128+32E each. (The MSU 260 operates at half the frequency of the SDS 270, and hence MSU data is made twice as wide to match the SDS data bandwidth.)

The serialized data is then divided into odd-numbered doublewords and even-numbered doublewords. The even-numbered doublewords (which comprise 64 bits of data plus 16 bits of ECC) are carried into the first part of the SDS 270 by bus 470. Odd-numbered doublewords are carried into another part of SDS 270 by bus 469. The other part of the SDS 270 is identical to the illustrated portion which handles the even-numbered doublewords. For the sake of brevity, the odd-numbered doubleword handling portion is not shown or further discussed.

As each AI signal (350) travels along bus 251 from SC 250 to MSU port 261, a copy of that signal (350') moves along a second bus 252 (within SC 250) to enter a delay pipe (shift register) 451. Delay pipe 451 is clocked by system clock pulses 452. Pipe 451 comprises a fat section 451a and a thin section 451b. The fat section 451a remains within the confines of the SC 250 while the thin pipe section 451b extends out of the SC 250 and into the SDS 270.

An output end of fat pipe 451a drives a 25-bit wide bus 453. Bus 453 supplies delayed copies of the AI bits A31:07 which earlier entered MSU port 261 to a first-syndrome address register (FSAR) 455 for storage therein. An 8-bit wide offshoot 454 of thin pipe section 451b carries address bits A30-A27 and A06-A03 to comparators 418, 428 and 438. (Address bit A27 is not used in this implementation.)

As each data output signal (DO) leaves MSU port 266, and arrives at SDS port 276, a copy 471 of the even-numbered doubleword portion of its data section (plane 371) is supplied to an ECC regenerator 473. The ECC regenerator 473 produces an expected error correction code 474 (16 bits wide) from the data portion 471 of the received DO signal. A bank of sixteen (16) exclusive-OR gates (XOR) 475 are provided for comparing each regenerated 16-bit wide ECC bit 474 against a corresponding bit 472 in the ECC section of the received DO signal.

OR gate 477 collects the outputs of the XOR gates in bank 475 and OR's them together to produce a correctable-error signal (CERR) 480. CERR signal 480 goes to logic one ("1") if one or more of XOR gates 475 outputs a logic one (indicating a mismatch between the expected ECC bit and the received ECC bit). Otherwise, the CERR signal 480 stays at logic zero ("0"). The first time that CERR signal 480 goes high, a first-error CER1 strobe is generated by first error detector E1.

Thereafter the CER1 remains low until the E1 circuit is later reset (by SVP 220).

Delay pipe 451 is structured such that, when there is a data error, the corresponding address signal (AI) of an error-infected dataword will arrive at the input of the FSAR register 455 just before the first-error CER1 signal goes high.

When a first mismatch is detected among the outputs of the XOR gates 475, the corresponding address bits A31:07 (453) of the first-detected error-infected dataword are stored in FSAR 455. This is done only the first time that CERR signal 480 goes high within a signature extraction run, thereafter the FSAR register 455 is frozen so that it will not respond to further activations of the CERR signal 480 during the run. At the same time, the corresponding address bits A06:03 which emerge from the thin pipe section 451b are loaded into first error-infected data word identifying register (FSDW) 456. It should be noted that FSAR 455 is positioned within SC 250 while FSDW 456 is positioned within the SDS 270.

The CERR signal 480 is further supplied to a first accumulating register 410 which keeps count of the total number of ECC errors detected by XOR gates 475 during the signature extraction run. (Counter 410 is a 12-bit wide counter which is initially set to zero and increments its internal count with each activation of the CERR signal 480.)

The output of total error counter 410 couples to an upper bound comparator 412. If the total count within counter 410 reaches a predefined upper bound (e.g., UPBOUND $\leq 2^{12}$), comparator 412 activates an equality-indication signal (EQUP) 415. (Each of counters 410, 420, 430, 440 and 490 is twelve bits wide in this implementation.) The EQUP signal 415 feeds back to the total counter 410 and stops the increment operation of counter 410 when the total count reaches the upper bound (UPBOUND). At the end of a signature extraction run, the total count within counter 410 is also output to the service processor unit (SVP) 220 as scan-out data. Typically, a signature extraction run begins with the detection of the first error (CER1) and it terminates after the error report (CERR) passes through a delay and actuates a system-clock stopping mechanism (not shown). After clocks stop, the SVP 220 begins to perform error-recovery activities. During this time, it scans out the count within counter 410 and other counters, 420, 430, 440, 490, as will be discussed shortly.

The CERR signal 480 is further supplied to a comparator masking AND gate 419. Each time the CERR signal 480 goes high after the first-detected error is encountered in an extraction run, it lets a comparison result produced by comparator 418 through gate 419 (assuming the EQUP signal 415 is low). Comparator 418 compares address bits A30:A29 which are output from FSAR 455 against the same address bits A30:A29 which are then output from offshoot bus 454. If they match, and the upper bound (UPBOUND) has not been reached, AND gate 419 passes the comparison result (logic one) to a second, initially-zeroed counter 420. This increments the count in counter 420. The second counter 420 maintains a count of the number of detected errors which have the same element-identifying bits A30:A29 as those stored in the FSAR register 455.

A second address comparator 428 simultaneously receives the bank identifying address bit A28 from offshoot bus 454 and compares it against the corresponding address bit A28 output by FSAR 455. If they are equal and the CERR signal 480 is active and the upper bound has not been reached (EQUP is not at logic one), then AND gate 429 sends an increment command to an initially-zeroed third counter 430. Third counter 430 keeps track of the number of correctable errors whose bank-identifying bit A28 matches that of the first captured address in FSAR 455.

A third address comparator 438 simultaneously receives the corresponding doubleword identifying address bits A06:03 from offshoot bus 454 and from the FSDW register 456. If they are equal and the CERR signal 480 is active and the upper bound has not been reached, a corresponding AND gate 439 issues an increment command to a fourth initially-zeroed counter 440. Fourth counter 440 keeps count of the number of detected errors whose address bits A06:03 match those of the error-infected dataword first captured in the FSDW register 456.

At the end of a signature extraction run, the values held in FSAR 455, FSDW 456, soon-to-be discussed registers FSYNR 485, NBIDR 482, and the counts maintained in the second, third and fourth counters (420, 430, 440) are supplied as scan-out data to the SVP 220. The counters, and registers FSAR 455, FSDW 456, FSYNR 485, NBIDR 482, are cleared thereafter in preparation for a successive extraction run.

Yet, a fifth counter 490 is provided for maintaining a same-syndrome count. The value held within fifth counter 490 is also scanned out by the service processor (SVP) 220 at the end of a run and thereafter cleared.

The 16-bit wide output of XOR bank 475 can be divided into two subsets. A first subset of 12 bits identifies which nibble in the 20-nibble wide doubleword (64+16E bits) that was received on even-DW bus 470 was found to be in error. The other four bits in the 16-wide syndrome identify the specific one or more bits in the error-infected nibble which need to be flipped. The first 12 bits of the syndrome are decoded into 20 nibble-identifying bits by decoder 480. The 20 bits are referred to as the nibble identification, or NBID for short. The NBID is stored in a NBIDR register (482) when the CER1 signal goes high.

The other four bits of syndrome of the first-detected error-infected doubleword is stored in a first-syndrome register (FSYNR) 485. This register 485 is strobed by the CER1 signal at the occurrence of the first error and thereafter is frozen (connection not shown). The saved four bits are referred to as the error-infected bits identification, or EBID for short. During the signature extraction run, the first captured EBID in FSYNR 485 is compared by comparator 488 against the EBID syndrome portions 481 of later-received error-infected datawords. If the EBID's match and the upper bound (EQUP 415) has not been reached, a corresponding AND gate 489 issues an increment command to the fifth counter 490. (The fifth counter 490 is initialized to zero at the beginning of the run.)

A signature extraction run ends either when a predetermined time span has elapsed or after the upper bound of comparator 412 has been reached or after the combination of both conditions has been met. The counts held by the first through fifth counters, 410, 420, 430, 440 and 490, and the contents of FSAR 455 and FSYNR 485 are then scanned out by SVP 220, and a new run is begun.

Typically a plurality (e.g., 5 to 25) of signature extraction runs will execute between scheduled maintenance shutdowns. When a scheduled maintenance is about to begin, the signature extraction results collected by the SVP 220 are examined to see if any match one of the plurality of model signatures produced in the model environment.

Figure 5:
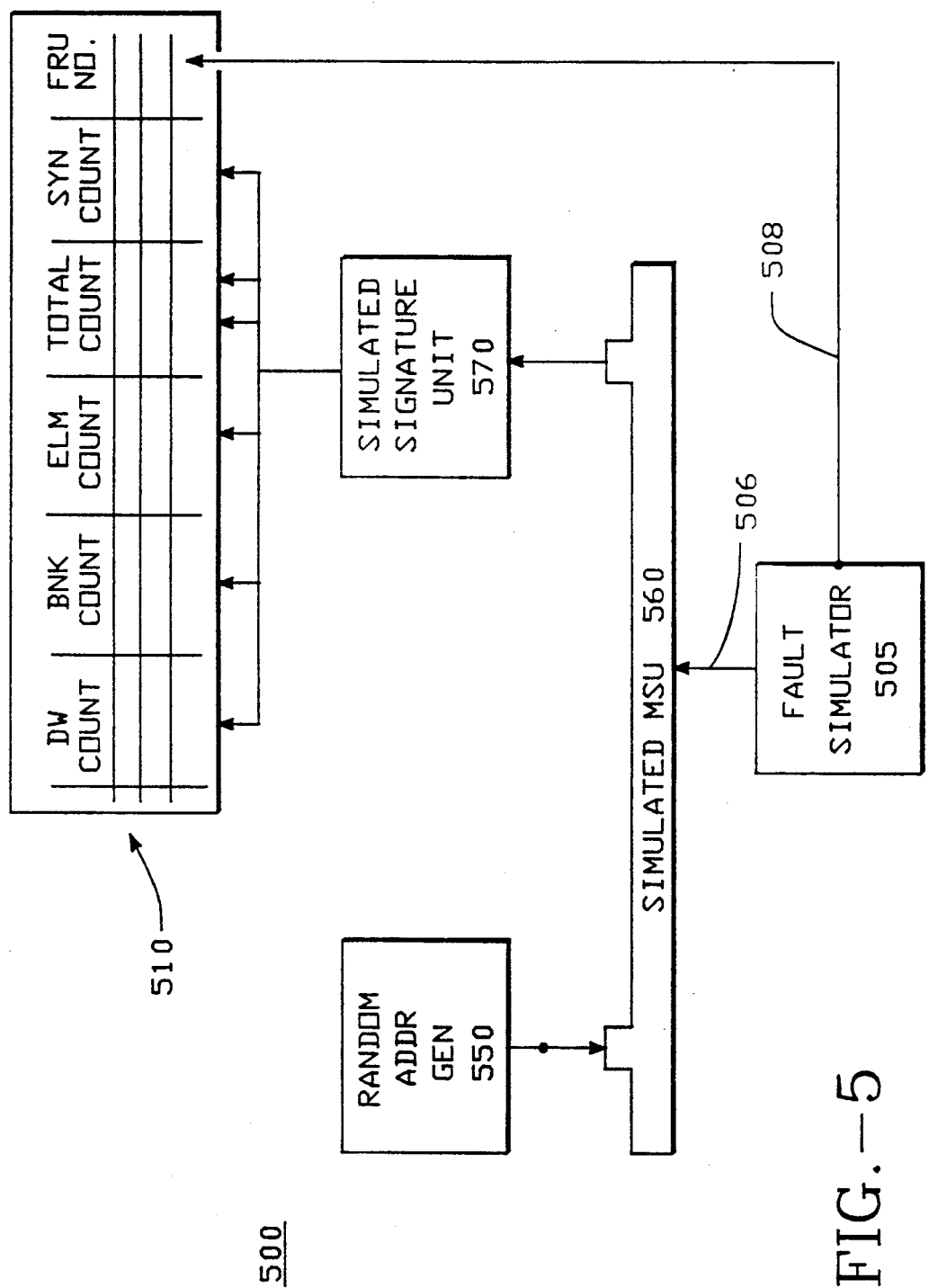
FIG. 5 illustrates a simplified pattern generating scheme for a model environment.

Referring to FIG. 5, there is shown a model signature pattern generating system 500 which operates in counterpart to the signature unit 400 of FIGS. 3 and 4.

System 500 is preferably implemented in software using techniques well known to those skilled in the art. A random number generator 550 produces random address signals which are supplied to the AI port of a simulated MSU 560.

A random set of data values are stored within the simulated memory modules of simulated MSU 560. Addressed ones of the simulated data blocks (lines) within MSU 560 are output from the DO port of MSU 560 together with their corresponding ECC signals for processing by a simulated signature extraction unit 570.

Simulated signature unit 570 performs the same functions as the hardware implemented signature unit 400 of FIG. 4. Since speed is not a prime concern in the modeling environment 500 as it is in the real machine environment of unit 400, the simulated signature unit 570 does not need to operate as quickly as does the signature unit 400 of the real machine.

A fault simulator 505 sends fault specifications 506 to the simulated MSU 560 to cause MSU 560 to behave as if it has various types of faults such as intermittent contacts, stuck data lines, stuck address lines, etc. Specification 506 defines which FRU portion of MSU 560 is to experience the specified fault (or faults). Concurrently, a FRU-identifying signal 508 is supplied to an output file 510 to identify the FRU that has the specified fault implanted into it.

As seen in FIG. 5, output file 510 is organized as a plurality of rows and columns. One of the columns receives the FRU identification signal 508 for storage at an appropriate row thereof. At the end of each test run, the remaining columns of the same row are filled with the values which respectively define the matched doubleword count (same as that which would have been generated by fourth counter 440 in FIG. 4 under similar circumstances), the matched bank count (same as would have been generated by counter 430), the matched element count (same as would have been generated by counter 420), the total count (same as would have been generated by total counter 410), and the syndrome count (same as would have been generated by syndrome counter 490 of FIG. 4).

The below Table 1 is an example of results obtained with a modeling system 500 similar to the one shown in FIG. 5.

The columns of Table 1 are respectively defined in left to right order as (A) the position of the simulated fault, (B) the total error count obtained, (C) the number of error counts with matching element addresses, (D) the number of error counts with matching bank addresses, (E) the number of error counts with matching dataword addresses, and (F) the number of error counts with matching nibble addresses. Column G contains signature names. These will be described later on.

The column F factor (the matching nibble code), has not been mentioned before. The 20 lines output from decoder 480 (FIG. 4) identify the error-infected nibbles. Before the tests of Table 1 were conducted, it was thought that this would provide a distinguishing attribute for the generated signature patterns. As seen in the below Table 1, however, it turned out that the nibble factor did not provide more distinguishing information than already provided by the total, element, bank, and doubleword counts. Accordingly, it was decided that a nibble counter would not be included in the preferred signature unit 400, as applied to the disclosed MSU architecture. This does not mean that a nibble identifying factor would not be useful in other applications. It simply turned out to be non-useful in this specific application.

Referring briefly back to FIG. 1, the above elimination of the nibble factor-matched count in unit 400 is an example of how the initial attributes list 109a,b,c, . . . is filtered down to a list of distinguishing individual signatures 109a',b',c', . . . . Table 2 shows how these values are thereafter normalized against the total count column, (A).

TABLE 1

| A<br>Fault Position | B<br>Total<br>Count | C<br>Element<br>Count | D<br>Bank<br>Count | E<br>DW<br>Count | F<br>Nibble<br>Count | G<br>Pattern<br>Name |
| --- | --- | --- | --- | --- | --- | --- |
| (1) Stuck address line (263) in RAM board (342) at pre-fanout position | 64 | 63 | 31 | 7 | 11 | (a) |
| (2) Stuck DI line (269) entering RAM board (342) | -Not Tested- (should be the same as row 4) | | | | | (b) |
| (3) Single RAM chip data output (265) stuck on RAM board (342) | -Not Tested- (results derived from schematic) | | | | | (c) |
| (4) Stuck data receiving bus (265) or chip on DO board (368) | 63 | 62 | 26 | 62 | 62 | (b) |
| (5) Stuck port driver (to MSU port 266) on DO board (368) | 1023 | 239 | 511 | 254 | 1022 | (d) |
| (6) Line on DI distributing bus (269) or bad bus driver on DI board (367) | 512 | 127 | 255 | 511 | 511 | (e) |
| (7) Stuck line or bad receiver chip on DI board (367) receiving data from MSU port 267 | 1023 | 251 | 521 | 117 | 1022 | (f) |

TABLE 1-continued

| A<br>Fault Position | B<br>Total<br>Count | C<br>Element<br>Count | D<br>Bank<br>Count | E<br>DW<br>Count | F<br>Nibble<br>Count | G<br>Pattern<br>Name |
|---|---|---|---|---|---|---|
| (8) Bad driver chip on AI board (361) which drives bus (263) or stuck line on same bus 263 | -Not Tested- (should be the same as row 1) | | | | | (a) |
| (9) Bad address or control driver on AI board (361) | 192 | 191 | 99 | 8 | 63 | (a) |

TABLE 2

| A<br>Total<br>Fault Position | B<br>Element<br>Count | C<br>Bank<br>Count | D<br>DW<br>Count | E<br>Nibble<br>Count | F<br>Pattern<br>Count | G<br>Name |
|---|---|---|---|---|---|---|
| (1) Stuck address line in RAM board (342) at pre-fanout position | x + 1 | x | x/2 | x/8 | y | (a) |
| (2) Stuck DI line (269) entering RAM board | x + 1 | x | x/2 | x | x | (b) |
| (3) Single RAM chip data output (265) stuck | x + 1 | x | x | x | x | (c) |
| (4) Stuck data receiving bus (265) or chip on DO board | x + 1 | x | x/2 | x | x | (b) |
| (5) Stuck port driver (to MSU port 266) on DO board (368) | x + 1 | x/4 | x/2 | x/4 | x | (d) |
| (6) Line on DI distributing bus (269) or bad bus driver on DI board (367) | x + 1 | x/4 | x/2 | x | x | (e) |
| (7) Stuck line or bad receiver chip on DI board (367) receiving data from MSU port 267 | x + 1 | x/4 | x/2 | x/8 | x | (f) |
| (8) Bad driver chip on AI board (361) which drives bus (263) or stuck line on same bus 263 | x + 1 | x | x/2 | x/8 | y | (a) |
| (9) Bad control or address driver on AI board (361) | x + 1 | x | x/2 | x/8 | y | (a) |

Nine different fault conditions were considered. Column A of Tables 1 and 2 is keyed against FIG. 3A to simplify the reading of its entries. Column A, rows 1-3, cover faults on a RAM board (e.g., 342), Rows 4 and 5 cover faults on a DO board (e.g., 368). Rows 6 and 7 cover faults on a DI board (e.g., 367). Rows 8 and 9 cover faults on an AI board (e.g., 361).

Table 2 shows the theoretically expected counts for each of the error conditions. The first received error does not increment any of the element, bank, doubleword or nibble counters, and accordingly, the total count is always at least one more than the maximum count x in any of the other counters.

As seen in the topmost row of Table 2, for any given total count expressed as x+1, the number of matching element addresses is expected to be x, the number of matching bank counts is expected to be half of x, the matching number of doubleword addresses is expected to be one-eighth the value x; and no correlation is seen between the nibble count and the fault (thus, it is labelled "y"). The three counts of row 1, columns C, D, and E are referred to in combination as a type "a" signature. Note that the same type "a" signature appears in rows 8 and 9.

Six different signature patterns are derived from the tests of Table 1 or otherwise calculated out by virtue of the design of the MSU 260. The distinguishable signature types are respectively named (a), (b), (c), (d), (e) and (f).

When a maintenance check is scheduled for computer system 200 (FIG. 2), an examination is first made of the SVP 220 log outs for the values held in counters 410, 420, 430, 440 (and optionally 490) of signature unit 400 (FIG. 4) at the end of each signature extraction run. The values are normalized so that the count in counter 410 represents x+1. A comparison is then made to see if the normalized log-out values match any of the model signatures (a)-(f) of Table 2. The best match indicates the most probable type of FRU that was at fault.

Once a model-matching signature is found, identifying the location of the faulty FRU is relatively straight forward. The corresponding log-out from the FSAR 455 provides address bits A31-A07. Assuming the faulty-FRU type is a RAM board, these address bit identify the specific element to which the board belongs and also the specific bank on the board which was at fault. The corresponding log-out of FSDW register 456 provides address bits A06-A03. These identify the specific quadword or doubleword which was at fault. Additionally, a log-out of the corresponding nibble identification (NBID) in the NBIDR register 482 indicates which of the sixteen data nibbles on panel 301-107 or corresponding four ECC nibbles on panel 309 was at fault. The nibble identification inherently identifies the data byte or ECC byte which was at fault.

Referring to FIG. 3A, once the faulty element is identified, the faulty panel (301-309) is identified, and the relative address within the element is determined, it is relatively straight forward to determine which RAM board on which panel should be removed and replaced with a like FRU. The remaining information, such as bank number and the specific nibble number are used at the factory when the suspect FRU is returned for in-factory repair. This additional address information tells factory service men which SRAM chip or other plant-replaceable unit (PRU) is suspect.

Similar isolating techniques are used for isolating the location of other types of FRU's. The main problem is identifying which type of FRU is most likely to be at fault. The address signals do not indicate whether it is a RAM board, a DO board, an AI board or a DI board. Once this is determined, isolating the fault is less of a problem.

Assume, for example, that in a particular case, the FSAR value points to the local MSU (260), second panel (303), left bank (B2). Assume that the signature pattern is type "d". This tells the engineer that the problem is probably in one of the left-side DO boards (366, 368) of the second panel. If the signature type had been "b" this would also implicate the DI board (367) of second panel 303 and the cables (269) extending from it to the left side RAM boards.

The above disclosure is to be taken as illustrative of the invention, not as limiting its scope or spirit. Numerous modifications and variations will become apparent to those skilled in the art after studying the above disclosure.

By way of example, accompanying data signals could be used in place of or in conjunction with the address signals accompanying error-infected data to generate/extract signatures. Signature extraction can be used for identifying the probable faulty FRU's in the extended storage unit (280, FIG. 2) or in other of the units which fetch address-accompanied data from one another.

Given the above disclosure of general concepts and specific embodiments, the scope of protection sought is to be defined by the following claims.

What is claimed is:

1. A signature generating apparatus for generating a signature signal which indicates a probable location for an error-causing mechanism within a digital system, where the digital system has control-signal and data-signal carrying busses and error detection means for detecting error conditions in the signals carried by those busses, the signature generating apparatus comprising:

first counter means, coupled to the error detection means, for counting the total number of errors detected by the error detection means during a signature generating run;

second counter means, coupled to the error detection means and the signal carrying busses of the system, for counting the number of errors detected by the error detection means during a signature generating run where those errors were accompanied by the presence of accompanying signals on the signal-carrying busses, the accompanying signals being ones which belong to a predefined subset of all signals appearing on the system signal-carrying busses.

2. A method for generating a signature signal which indicates a probable location for an error-causing mechanism within a digital system, where the digital system has control-signal and data-signal carrying busses and error detection means for detecting error conditions in the signals carried by those busses, the signature generating method comprising the steps of:

counting the total number of errors detected by the error detection means during a signature generating run; and counting the number of errors detected by the error detection means during a signature generating run where those errors were accompanied by the presence of accompanying signals on the signal-carrying busses, the accompanying signals being ones which belong to a predefined subset of all signals appearing on the system signal-carrying busses.

* * * * *

UNITED STATES PATENT AND TRADEMARK OFFICE
CERTIFICATE OF CORRECTION

PATENT NO. : 5,220,567
DATED : June 15, 1993
INVENTOR(S) : Dave Dooley et al.

It is certified that error appears in the above-identified patent and that said Letters Patent is hereby corrected as shown below:

Column 4, line 35, delete "error" and insert --errors--;
Column 11, line 46, delete the semicolon ";" ;
Column 13, line 43, delete the indentation before the word "data";
Column 17, line 23, delete the semicolon ";" and insert a period -- . --; and
Column 18, line 17, delete "back" and insert --bank--.

Signed and Sealed this

Twenty-sixth Day of April, 1994

Attest:

BRUCE LEHMAN

*Attesting Officer*   Commissioner of Patents and Trademarks